US012597075B2

(12) United States Patent
Kim et al.

(10) Patent No.: US 12,597,075 B2
(45) Date of Patent: Apr. 7, 2026

(54) SYSTEMS AND METHODS FOR ENHANCING INSURANCE OPERATIONS USING A MOBILE DRIVER'S LICENSE

(71) Applicant: Wells Fargo Bank, N.A., San Francisco, CA (US)

(72) Inventors: Misung Kim, San Francisco, CA (US); Jenny Y. Tao, Philadelphia, PA (US); Prafullata Diwate, San Francisco, CA (US); Jennifer A. Fisher, Belmont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/771,954

(22) Filed: Jul. 12, 2024

(65) Prior Publication Data

US 2026/0017726 A1 Jan. 15, 2026

(51) Int. Cl.
*G06Q 40/08* (2012.01)

(52) U.S. Cl.
CPC ......... *G06Q 40/0822* (2025.08); *G06Q 40/08* (2013.01); *G06Q 40/082* (2025.08)

(58) Field of Classification Search
CPC ... G06Q 40/08; G06Q 40/082; G06Q 40/0822
See application file for complete search history.

(56) References Cited

U.S. PATENT DOCUMENTS

| | | | |
|---|---|---|---|
| 2018/0342018 A1* | 11/2018 | Pancholi ............... | G06F 3/0482 |
| 2021/0082044 A1* | 3/2021 | Sliwka .................. | H04L 9/3255 |
| 2022/0207524 A1* | 6/2022 | Geusz .................. | G06Q 20/227 |
| 2022/0406455 A1* | 12/2022 | Tresnak ................. | G06Q 20/18 |
| 2023/0179590 A1* | 6/2023 | Kim ...................... | H04L 9/3247 726/6 |
| 2024/0022565 A1* | 1/2024 | Keith, Jr. ............ | H04L 63/0861 |

* cited by examiner

*Primary Examiner* — Scott C Anderson
(74) *Attorney, Agent, or Firm* — K&L Gates LLP

(57) ABSTRACT

Systems, apparatuses, methods and computer program products are disclosed for using a mobile driver's license (mDL) to enhance insurance data exchange for an insurance event. An example method includes transmitting an identity verification request to a user device. The example method further includes receiving, from the user device, an identity verification response comprising a mDL. The example method further includes verifying, based on the identity verification response, authenticity of the mDL. The example method further includes generating, using a risk determination model, a secondary verification protocol. The example method further includes, verifying, using the secondary verification protocol, user identity. The example method further includes identifying an insurance entity associated with the mDL. The example method further includes transmitting to the insurance entity, an insurance data request. The example method further includes receiving, by a provider device, and in response to the insurance data request, insurance data associated with the user.

17 Claims, 7 Drawing Sheets

SYSTEMS AND METHODS FOR ENHANCING INSURANCE OPERATIONS USING A MOBILE DRIVER'S LICENSE

BACKGROUND

Service providers, such as those in healthcare, require users to provide insurance data in order to verify coverage, facilitate billing and reimbursement, and provide cost estimates for services rendered. However, conventional insurance data exchange systems and techniques exhibit numerous drawbacks, inefficiencies, and limitations.

BRIEF SUMMARY

Conventional insurance data exchange systems, such as those used by service providers, operate by manually gathering and analyzing various elements of insurance information associated with a corresponding user. The process of gathering and maintaining updated insurance information of a user is crucial for minimizing the risk of error and of insurance fraud. However, current insurance data exchange systems typically rely on manual processes, which may be time-consuming and error prone. For instance, collecting and verifying insurance information such as insurance providers and plan type, insurance policy and group number, etc., involve numerous steps and require cumbersome form-filling practices. This manual effort often leads to delays, increased administrative workload, and the potential for human error in exchanging insurance data.

Additionally, the manual handling of insurance data introduces significant privacy concerns. When users physically provide documentation (e.g., insurance cards or filled-out forms) containing sensitive personal information, such as social security numbers, date of birth, address, insurance policy and group number, and/or the like, there exists an inherent risk of data breaches and misuse. Service providers may misplace such materials, copy them, and for various reasons may expose them visibly to individuals who do not have authority to view such content. Existing processes that rely on physical document exchange are present a substantial risk of unauthorized access or data leaks. In particular, the manual handling of insurance data may lead to unauthorized access and/or exposure, which not only compromises the security of the user's insurance information, but also exposes service providers to potential legal liabilities and damage to their reputations. Evidently, ensuring robust insurance data exchange protection measures and adoption of more secure, methods for exchanging of insurance data has become imperative. Underpinning this need is a failure of existing technology to offer solutions that remove the physical exchange of materials from the insurance data exchange process. As such, there is a unique need for a technical solution that automates and streamlines the insurance data exchange process by minimizing the manual exchange of insurance data. Given that the exchange of insurance data often must occur in near-real-time to meet time-sensitive requirements (e.g., providers must determine coverage status prior to admitting a patient, or may need to submit insurance claims while a patient waits), in many parallel instances at scale, and without exposing the underlying patient data to individuals who may be physically present within an office environment, a systematic and computer-based implementation is necessary. In other words, there exists an underlying technical necessity for an insurance data exchange system that is able to autonomously provide this capability.

Example implementations described herein provide a technical solution to this technical problem, and in doing so overcome the challenges that arise from the manual exchange of insurance data during an insurance event. In contrast to conventional techniques for exchanging insurance data, example embodiments described herein comprise an insurance data exchange system 102 configured to utilize a mobile driver's license (mDL) associated with a user to verify the user prior to exchanging insurance data. In this regard, the insurance data exchange system 102 may be employed to remotely verify the user based on a respective mDL associated with the user. As will be described in greater detail below, utilizing mDLs that have been issued by legally entitled entities (e.g., government agencies) adds an additional layer of trust when exchanging insurance data facilitated by the insurance data exchange system 102. Furthermore, utilizing mDLs to verify users ensures that only intended service providers are receiving relevant insurance data associated with a particular insurance event. The solutions described herein therefore operate in a wholly new fashion that is distinct from existing approaches (i.e., they do not comprise the mere automation of previously manual activity, but instead set forth an entirely new sequence of operations unlocked via use of an mDL within a computer-implemented infrastructure).

Furthermore, example implementations described herein are not limited solely to traditional insurance events (e.g., healthcare) and may also be extended to non-traditional insurance events such as travel insurance for trips and vacations (e.g., emergency medical coverage), event insurance for special occasions (e.g., event liability insurance), pet insurance, auto insurance, homeowners and renters insurance, gadget and electronic device insurance, adventure and sports insurance, legal expenses insurance, insurance for voluntary work, and/or the like, for whom verification of the identity of the user is required. In such instances, the example embodiments described herein facilitate the seamless provision of exchange of insurance data whilst eliminating the need for manual documentation and form-filling for identity verification and exchange of insurance data. This versatile feature underscores the applicability of the technical solution across diverse insurance event contexts, thereby enhancing its utility and value proposition in various operational settings.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

System Architecture

Figure 1:
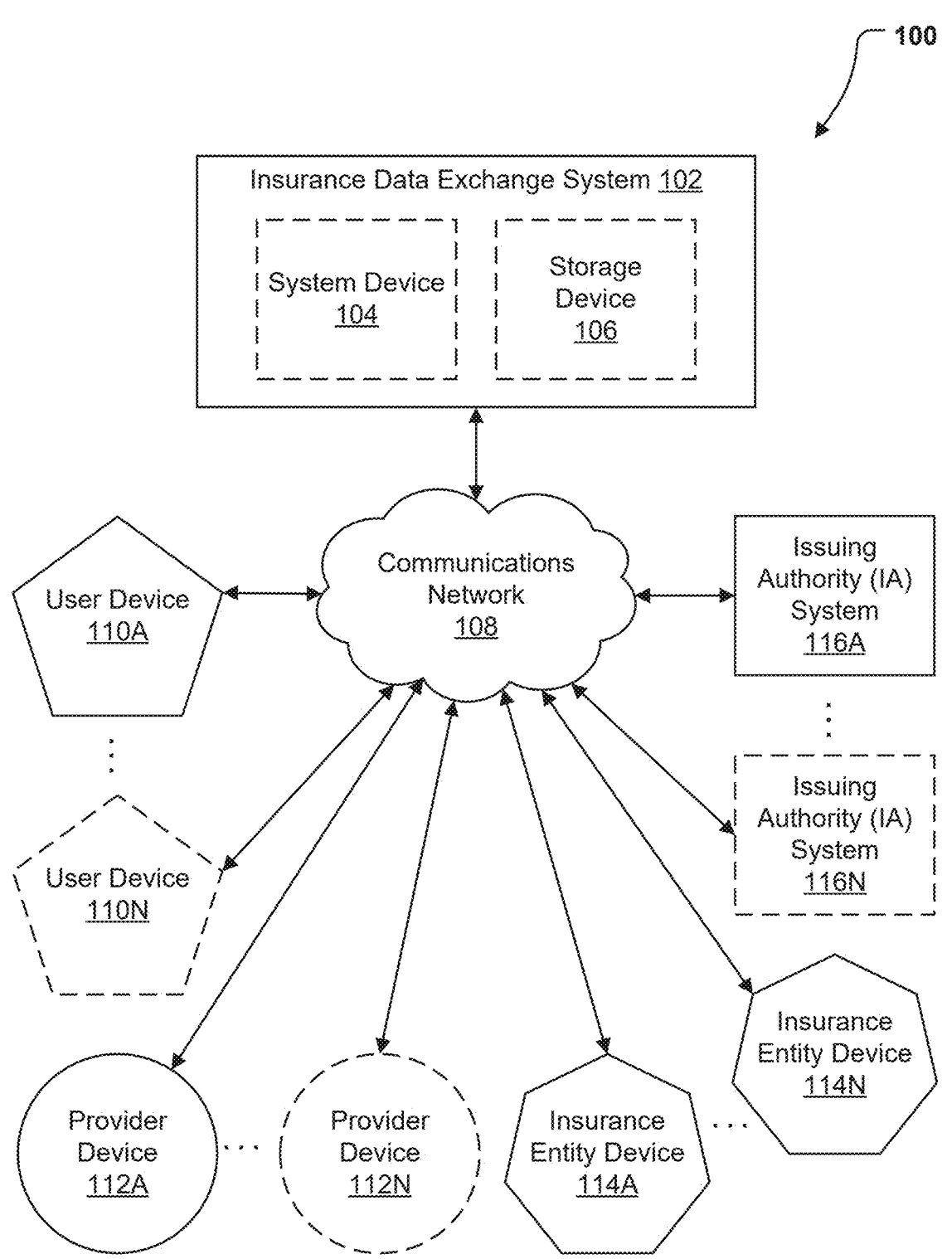
FIG. 1 illustrates a system in which some example embodiments may be used for using a mobile driver's license (mDL) to enhance insurance data exchange for an insurance event.

Example embodiments described herein may be implemented using any of a variety of computing devices or servers. To this end, FIG. 1 illustrates an example environment 100 within which various embodiments may operate. As illustrated, an insurance data exchange system 102 may receive and/or transmit information via communications network 108 (e.g., the Internet) with any number of other computing devices and/or computing systems, such as one or more of user devices 110A-110N, provider devices 112A-112N, insurance entity devices 114A-114N, and/or issuing authority (IA) systems 116A-116N. Although system device 104 and storage device 106 are described in singular form, some embodiments may utilize more than one system device

104, more than one storage device 106, and/or the like. The one or more user devices 110A-110N, provider devices 112A-112N, and/or insurance entity devices 114A-114N, may be embodied by any computing devices known in the art. The one or more user devices 110A-110N, provider devices 112A-112N, insurance entity devices 114A-114N, and/or issuing authority (IA) systems 116A-116N need not themselves be independent devices but may be peripheral devices communicatively coupled to other computing devices. The one or more user devices 110A-110N may include laptops, tablets, phones, the one or more provider devices 112A-112N may be a device associated with a service provider (e.g., medical clinic), and the one or more insurance entity devices 114A-114N may be device associated with a particular insurance entity that provides insurance coverage for a particular user and/or secondary user.

The insurance data exchange system 102 may be implemented as one or more computing devices or servers, which may be composed of a series of components. These components of system device 104 may be physically proximate to the other components of the insurance data exchange system 102, while other components are not. The system device 104 may receive, process, generate, and transmit data, signals, and electronic information to facilitate the operations of the insurance data exchange system 102. Particular components of the insurance data exchange system 102 are described in greater detail below with reference to apparatus 200 in connection with FIG. 2.

In some embodiments, the insurance data exchange system 102 further includes a storage device 106 that comprises a distinct component from other components of the insurance data exchange system 102. Storage device 106 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 108). Storage device 106 may host the software executed to operate the insurance data exchange system 102. Storage device 106 may store information relied upon during operation of the insurance data exchange system 102, such as user identification data that may be used by the insurance data exchange system 102, data and documents to be analyzed using the insurance data exchange system 102, or the like. In addition, storage device 106 may store control signals, device characteristics, and access credentials enabling interaction between the insurance data exchange system 102 and one or more of the user devices 110A-110N, provider devices 112A-112N, insurance entity devices 114A-114N, and/or issuing authority (IA) systems.

In some embodiments, the insurance data exchange system 102 may be configured to facilitate the execution of one or more processes related to verifying an mDL associated with a user and/or a secondary user. As a non-limiting example, the insurance data exchange system 102 may be configured to verify a user and/or a secondary user based on a respective mDL associated with the user and/or secondary user before triggering the exchange of insurance data. In this regard, the insurance data exchange system 102 may be configured to store, integrate with, manage, and/or utilize one or more mDLs (and/or data related to the one or more mDLs (e.g., mDL identifying information, cryptographic key information)) associated with a user and/or secondary user in order to facilitate the various operations described herein. As used herein, the term "mDL" covers various mobile (e.g., digital) identity credential types associated with a user and/or secondary user including mobile driver's licenses and mobile identification cards. An mDL may be an electronically managed data structure configured to be accessed, processed, and/or otherwise utilized by the insurance data exchange system 102 for various verification processes.

In this regard, an mDL may be configured to store or point to (e.g., programmatically reference) various credential data associated with a user and/or secondary user including, but not limited to, personally identifiable information (PII) (e.g., given name, family name, name prefix, name suffix, driver's license number, social security number, administrative number), user and/or secondary user information (e.g., height, eye color, hair color, age, organ donor status, veteran status, gender information, sex information, race information, ethnicity information, user and/or secondary user portrait image data, user and/or secondary user signature data), contact information (e.g., residential address information, phone number, email address), credential validity data (e.g., credential issue dates, credential expiration dates, credential revocation status), credential endorsement data (e.g., hazmat endorsement, commercial driver's license (CDL) data, Department of Homeland Security (DHS) compliance data (e.g., "REAL ID" compliance data), credential restriction data (e.g., driving restrictions, driving conditions, vehicle weight class restrictions), insurance data (e.g., insurance entity name, insurance policy and group number, etc.) and/or the like associated with the user and/or secondary user. Additionally, an mDL may be configured to store and/or point to various cryptographic key information (e.g., public key information used to identify the mDL, a corresponding user device and/or secondary user device, and/or a corresponding user and/or secondary user) and/or originating IA data (e.g., cryptographic key information and/or identifying data associated with an originating IA).

An mDL may be issued (e.g., provisioned) to a user and/or secondary user by an IA system 116A associated with a particular IA. An IA may be an entity that is legally entitled (or otherwise recognized as the relevant authority) to issue credentials, such as driver's licenses and/or other identification cards. An IA system 116A may be a computing system (e.g., a server system) associated with an agency, department, regulatory body, and/or government office entitled to issue legal credentials within a particular jurisdiction such as a respective county, township, state, province, or nation (in some implementations, an IA system may be a private organization authorized to act as the IA for a corresponding physical region). For example, an IA system 116A may be associated with a branch of the Department of Motor Vehicles (DMV) within a particular state in the United States (e.g., North Carolina) that is legally entitled to issue credentials (e.g., mDLs, driver's licenses, state identification cards) to individuals residing in that particular state. In some embodiments, an mDL may be issued in compliance with various national credentialing initiatives (e.g., REAL ID compliance) and/or may be issued under various licensing programs (e.g., the Enhanced Driver's License program (EDL). Additionally, or alternatively, in some embodiments, an mDL may be administered, managed, employed, and/or otherwise utilized by the insurance data exchange system 102 in compliance with various standards set forth by the American Association of Motor Vehicle Administrators (AAMVA). Additionally, or alternatively, in some embodiments, an mDL may be administered, managed, employed, and/or otherwise utilized by the insurance data exchange system 102 in compliance with various standards set forth by the International Organization for Standardization and the International Electrotechnical Commission (IEC) (e.g., ISO/IEC 18013-5). It will be understood that other standards may apply in some implementations.

An mDL may be a digital version of a physical legal credential (e.g., a driver's license) associated with a user and/or secondary user and may comprise and/or be associated with the same data as the legal credential. In some embodiments, an mDL associated with a user and/or secondary user may be stored in a storage device (e.g., a server system) of an IA system 116A and one or more portions of credential data related to the mDL may be retrieved in real time, or near-real time, during an insurance event associated with the user and/or secondary user (e.g., a user and/or secondary user visit a medical clinic and are required to provide their health insurance data, and/or the like). Additionally, or alternatively, once an mDL is issued to a user and/or secondary user by a respective IA (e.g., by way of a corresponding IA system 116AA), the mDL may be stored locally on a user device and/or secondary user device associated with the user and/or secondary user such that the mDL may be used without relying on a communications network (e.g., communications network 108). Additionally, or alternatively, in some embodiments, an mDL may be stored in a smart mobile wallet associated with the user and/or secondary user and managed by the insurance data exchange system 102, and the mDL may be accessed and/or utilized by the user and/or secondary user via the smart mobile wallet to execute various mDL-based operations.

In some examples, an IA may provision an mDL to a particular user device (e.g., user device 110A) associated with a user, and/or a secondary user device associated with a secondary user, such that the mDL is associated with various user identification data related to the particular user device (e.g., cryptographical identification data such as a public key). This may ensure that an mDL associated with a user and/or secondary user cannot be transferred to multiple devices without authorization by the IA system (e.g., IA system 116AA) and used in fraudulent insurance data exchange operations. Furthermore, associating an mDL with a particular user device (e.g., user device 110A) also enables the insurance data exchange system 102 and/or an IA system of an IA (e.g., IA system 116AA) to verify that the intended user and/or secondary user of the mDL is in possession of the mDL. Further still, associating an mDL with a particular user device (e.g., user device 110A) also ensures the safe transfer of sensitive credential data to and/or from the intended user and/or secondary user of the mDL. In various examples, a user and/or secondary user may store multiple copies of an mDL on multiple user and/or secondary user devices (e.g., user devices 110A-110N). However, in such examples, each respective copy of the mDL may be cryptographically coupled to a respective user device and/or secondary user device by the IA system (e.g., IA system 116AA) which provisioned the mDL. In this manner, each copy of the mDL can be independently verified against a respective user device and/or secondary user device to ensure that an mDL, or credential data associated with the mDL, cannot be transferred to unauthorized user devices and/or secondary user devices.

An mDL may be associated with various mDL data security mechanisms used to ensure the validity of the mDL, authenticate an originating IA that issued the mDL, protect a user and/or secondary user's personal data, and/or facilitate secure mDL-based operations. In this regard, an mDL may be associated with a mobile security object (MSO) and/or various public and private cryptographic key information. An MSO is an electronically managed data structure that enables the authentication of the accuracy and origin of various credential data associated with the mDL during mDL-based operations. In various examples, an MSO is associated with one or more portions of credential data related to the issue date, expiration date, user and/or secondary user signature, and/or expected credential update time associated with the mDL. In various embodiments, the one or more portions of credential data associated with the MSO may be used to verify the validity and/or status of the mDL during various insurance data exchange operations. For example, if the credential data associated with the MSO indicates that the mDL is expired, an insurance entity may not exchange insurance data associated with a user and/or secondary user with a particular provider.

Additionally, an mDL may be associated with various cryptographic key information (e.g., public/private key pair information) that may be utilized by the insurance data exchange system 102 to authenticate an originating IA that issued the mDL, verify one or more portions of credential data associated with an mDL, and/or facilitate various mDL-based operations (user and/or secondary user verification protocols, mDL data queries) for a user and/or secondary user associated with the mDL. For example, an IA associated with a respective IA system 116AA may be associated with a unique public key that may be utilized by the insurance data exchange system 102 to identify and/or authenticate the originating IA of a respective mDL. As such, in various examples, an mDL may be configured to store and/or point to the public key information associated with the IA from which the mDL was provisioned. Additional details related to the execution of various operations related to one or more mDLs associated with a user and/or secondary user by the insurance data exchange system 102 will be described in greater detail herein with reference to FIGS. 3-7.

Example Implementing Apparatuses

Figure 2:
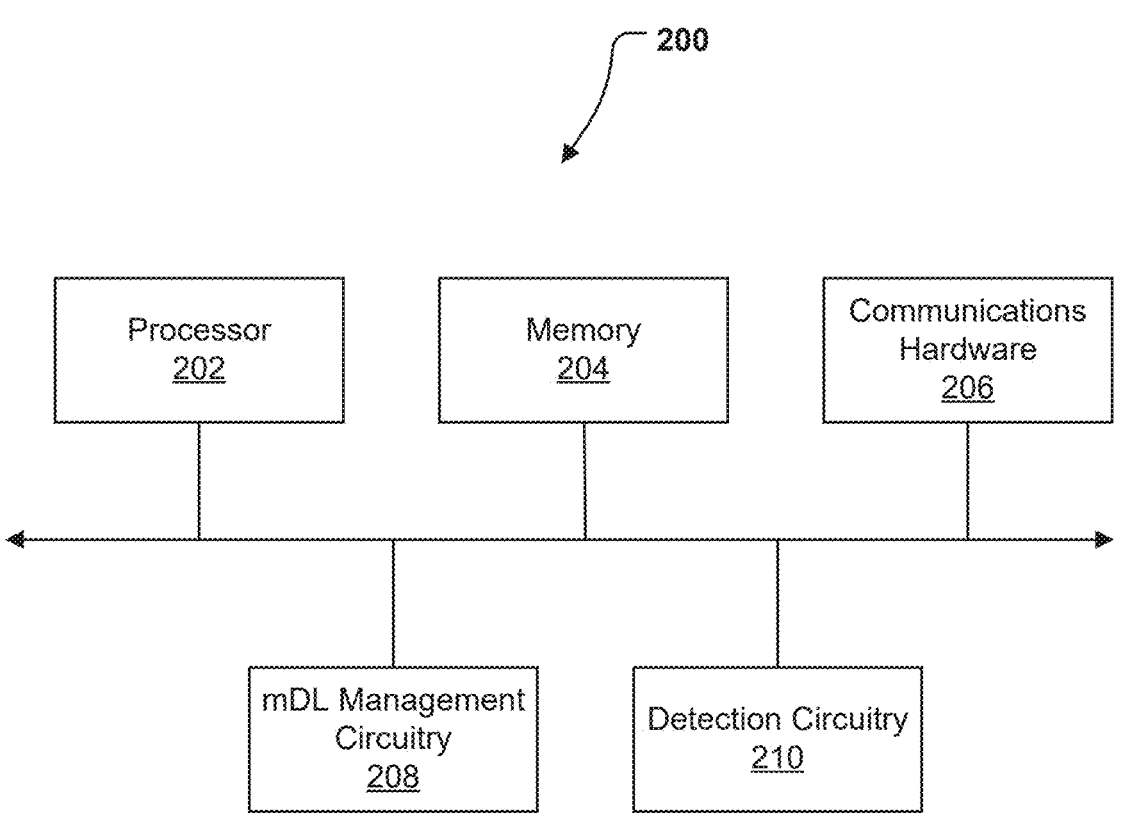
FIG. 2 illustrates a schematic block diagram of example circuitry embodying a system device that may perform various operations in accordance with some example embodiments described herein.

The insurance data exchange system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-7. As illustrated in FIG. 2, the apparatus 200 may include processor 202, memory 204, communications hardware 206, mDL management circuitry 208 and detection circuitry 210, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user, secondary user, provider, insurance entity, issuing authority system and, in some embodiments, to receive an indication of user and/or secondary user input, provider input, and/or insurance entity input. In this regard, the communications hardware 206 may comprise an interface, such as a display, and may further comprise the components that govern use of the interface, such as a web browser, mobile application, dedicated user device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these interface elements through software instructions (e.g., application software and/or system software, such as firmware) stored on a memory (e.g., memory 204) accessible to the processor 202.

In addition, the apparatus 200 further comprises mDL management circuitry 208. In some embodiments, the mDL management circuitry 208 may be configured to facilitate the execution of one or more mDL verification and/or IA verification operations for an insurance entity associated with the insurance data exchange system 102. Additionally, the mDL management circuitry 208 may utilize processor 202, memory 204, or any other hardware component included in the apparatus 200 to perform these operations, as described in connection with FIGS. 3-7 below. The mDL management circuitry 208 may further utilize the communications hardware 206 to gather data from, or transmit data to, a variety of sources (e.g., the user devices 110A-110N, provider devices 112A-112N, insurance entity devices 114A-114N, issuing authority (IA) systems 116A-116N, and/or any storage devices associated with the insurance data exchange system 102). In some embodiments, the mDL management circuitry 208 may work in conjunction with the detection circuitry 210 in order to execute one or more of the methods described herein. For example, in some embodiments, the mDL management circuitry 208 may integrate with and/or otherwise leverage the detection circuitry 210 to facilitate the verification of a mDL associated with the user, upon detection of a user within a provider environment.

In various circumstances, an IA system (e.g., IA system 116A) that previously issued an mDL to a user and/or secondary user may periodically update credential data associated with the mDL (e.g., new user and/or secondary user contact information, updated credential restrictions, updated credential endorsements). As such, the mDL management circuitry 208 may be configured to retrieve and/or receive updated credential data associated with a user and/or secondary user's mDL from an IA system (e.g., IA system 116A) and facilitate the updating of the user and/or secondary user's mDL based on the updated credential data. For example, if an mDL associated with a user and/or secondary user is stored in a smart mobile wallet being managed by the insurance data exchange system 102, the mDL management circuitry 208 may be configured to receive updated credential data associated with the user and/or secondary user's mDL from the originating IA system (e.g., IA system 116A) and subsequently update the user and/or secondary user's mDL in the smart mobile wallet based on the updated credential data.

In some embodiments, the mDL management circuitry 208 may update an mDL stored on a user device (e.g., user device 110A). In such embodiments, the mDL management circuitry 208 may be configured to query one or more storage devices (e.g., server systems) associated with an IA system (e.g., IA system 116A) in order to retrieve current and/or updated credential data in response to one or more interactions with a user device interface associated with the smart mobile wallet. Additionally, or alternatively, the mDL management circuitry 208 may be configured to periodically query to one or more storage devices (e.g., server systems) associated with an IA system (e.g., IA system 116A) based on a predefined schedule (e.g., once a day, once a week, once a month, once every 90 days) in order to retrieve current and/or updated credential data associated with a user and/or secondary users' mDL.

In various examples, an IA (e.g., a branch of the DMV) associated with a respective IA system (e.g., IA system 116A) may enforce various mDL data freshness requirements associated with the mDLs the IA system provisions to user and/or secondary users. In this regard, an MSO associated with a respective mDL may indicate a technical validity period associated with the mDL (e.g., a 30-day validity period). As such, the mDL management circuitry 208 may utilize the technical validity period indicated by the MSO to ensure that the credential data associated with the mDL stored on a user device (e.g., user device 110A) is updated and/or current. For example, if the mDL management circuitry 208 determines that the technical validity period indicated by the MSO has expired, the mDL may be invalidated until the credential data associated with the mDL is refreshed (e.g., updated, verified) by the IA system 116A associated with the IA from which the mDL was issued. In some examples, the technical validity period of the mDL indicated by the MSO may be shorter than a validity period of the mDL and/or the corresponding physical legal credential associated with the mDL (e.g., an expiration date of a driver's license associated with the mDL).

For example, legal credentials (e.g., a driver's license and/or the corresponding mDL) are commonly associated with a relatively long validity period (e.g., five to seven years from the date of issue of the legal credential). However, problems may arise if an IA assigns various credential restrictions (e.g., driving restrictions) and/or credential endorsements (e.g., weighted vehicle endorsements) to a particular user and/or secondary user's legal credential, yet the user and/or secondary user fails to have the legal credential (e.g., a corresponding physical credential) updated with said credential restrictions and/or credential endorsements. To address such problems, if the mDL management circuitry 208 determines that the technical validity period indicated by the MSO of the mDL has expired, the corresponding mDL may flag the mDL such that the mDL will fail various verification protocols during an mDL-based operation.

In this regard, the mDL management circuitry 208 may be configured to facilitate the resetting of the technical validity period indicated by the MSO of the mDL in conjunction with a corresponding IA system (e.g., IA system 116A). Additionally, or alternatively, the mDL management circuitry 208 may be configured to facilitate the updating and/or verification of the credential data associated with an mDL stored on a user device (e.g., user device 110A) each time the technical validity period associated with the MSO of the mDL is reset. This mDL data security mechanism ensures that the credential data associated with a user and/or secondary user's mDL is always accurate and up to date.

As described herein, an mDL may be associated with various cryptographic key information (e.g., public/private key pair information) that may be utilized by the insurance data exchange system 102 to authenticate an originating IA that issued the mDL, verify one or more portions of credential data associated with an mDL, and/or facilitate various mDL-based operations (e.g., user and/or secondary user verification protocols, mDL data queries) for a user and/or secondary user associated with the mDL. In this regard, the mDL management circuitry 208 may be configured to generate and/or transmit an IA authentication request comprising a public key associated with an IA to a corresponding IA system 116A in order to verify that a particular mDL was indeed provisioned by the IA associated with the IA system 116A.

In some examples, an mDL may only comprise (e.g., store, point to) identifying information related to a particular IA such that the mDL management circuitry 208 may be configured to first obtain a public key associated with the IA from a corresponding IA system 116A based on the identifying information. Once the public key information associated with the IA is obtained, the mDL management circuitry 208 may be configured to generate an IA authentication request comprising the public key of the IA and transmit the IA authentication request to the IA system 116A (e.g., via the communications network 108). As such, the mDL management circuitry 208 may be configured to receive, from an IA system (e.g., IA system 116A) and in response to the IA authentication request, one or more portions of data indicating whether the IA is a bona fide IA and/or whether the mDL indeed originated from the IA.

Once the mDL management circuitry 208 confirms the validity of the IA and/or confirms that a particular mDL associated with a user and/or secondary user originated from the IA, the mDL management circuitry 208 may be configured to generate a digital token comprising cryptographical information (e.g., public key information) associated with the mDL and the user and/or secondary user. Additionally, in some embodiments, the cryptographical information associated with the mDL and comprised in the digital token may be user identification data by which a user device (e.g., user device 110A) of the user and/or secondary user may be uniquely identified. In various examples, the mDL management circuitry 208 may generate and/or transmit the digital token to an IA system (e.g., IA system 116A) such that the IA system may decrypt the cryptographical information comprised in the digital token. In this manner, the IA system (e.g., IA system 116A) may verify one or more portions of credential data associated with the mDL and/or one or more portions of user identification data associated with the user device (e.g., user device 110A). In this regard, the mDL management circuitry 208 may be configured to receive, from the IA system (e.g., IA system 116A) and in response to transmitting the digital token, one or more portions of data indicating whether the mDL and/or the user device (e.g., user device 110A) identified by the digital token is valid. Furthermore, in various examples, the mDL management circuitry 208 may be configured to receive, from the IA system (e.g., IA system 116A) and in response to transmitting the digital token, one or more portions of credential data associated with the mDL.

In some embodiments, the mDL management circuitry 208 may be configured to generate a digital token comprising cryptographical information (e.g., public key information) associated with an mDL and/or a user device (e.g., user device 110A) associated with a particular user and/or secondary user in response to an mDL authentication request associated with the particular user and/or secondary user. In some embodiments, the mDL authentication request may be a request to authenticate an mDL associated with the particular user and/or secondary user and thereby authenticate the identity of the particular user and/or secondary user for one or more mDL-based operations. A respective mDL authentication request may comprise one or more of cryptographical information (e.g., public key information) associated with an mDL and/or a user device (e.g., user device 110A). Additionally, or alternatively, a respective mDL authentication request may comprise one or more desired data elements (e.g., one or more desired portions of credential data) associated with the mDL, location data, user profile data, user account data, social media data, smart mobile wallet identification data, user identification data, and/or the like associated with the particular user and/or secondary user.

In various examples, an mDL validity response received from an IA system (e.g., IA system 116A) based on a digital token generated by the mDL management circuitry 208 may comprise the entirety of the credential data associated with the mDL of the particular user and/or secondary user. Additionally, or alternatively, in various other examples, an mDL validity response received from an IA system (e.g., IA system 116A) based on a digital token generated by the mDL management circuitry 208 may comprise a verification of the desired credential data associated with the mDL that was indicated by an mDL authentication request. Additionally, or alternatively, in various other examples, an mDL validity response received from an IA system (e.g., IA system 116A) based on a digital token generated by the mDL management circuitry 208 may comprise a verification of the user identification data associated with the user device (e.g., user device 110A) of the particular user and/or secondary user. For example, the mDL validity response may verify that the user device currently associated with the mDL is the same (e.g., intended) user device that the mDL was originally provisioned to. In this manner, the insurance data exchange system 102 may be configured to confirm the validity of the mDL data of an mDL associated with a particular user and/or secondary user in order to authenticate the identity of the particular user and/or secondary user. Additionally, this enables the insurance data exchange system 102 to confirm whether the intended user and/or secondary user and/or user device (e.g., user device 110A) associated with the mDL is currently in possession of the mDL. These and other operations associated with the mDL management circuitry 208 will be described in further detail herein below with reference to FIGS. 3-7.

In some embodiments, the mDL management circuitry 208 may be configured to facilitate the execution of one or more user verification operations for an insurance entity associated with the insurance data exchange system 102. Additionally, the mDL management circuitry 208 may utilize processor 202, memory 204, to perform these operations, as described in connection with FIGS. 3-7 below. The mDL management circuitry 208 may further utilize the communications hardware 206 to gather data from, or transmit data to, a variety of sources such as user devices 110A-110N, provider devices 112A-112N, insurance entity devices 114A-114N, issuing authority (IA) systems 116A-116N, and/or any storage devices associated with the insurance data exchange system 102).

Additionally, the mDL management circuitry 208 may be configured to identify a smart mobile wallet associated with a user and/or secondary user. For example, the mDL management circuitry 208 may identify a smart mobile wallet associated with a user and/or secondary user based on user identification data associated with the user and/or secondary user. In some embodiments, user identification data associated with a user, such as user profile data, user account data, user contact data, social media data, location data, and/or smart mobile wallet identification data.

In various examples, once the mDL management circuitry 208 identifies a smart mobile wallet that is ostensibly associated with the user and/or secondary user, the mDL management circuitry 208 may be configured to generate a user identification data request based on user identification data associated with the user and/or secondary user. The mDL management circuitry 208 may be configured to leverage the communications hardware 206 to transmit the user identification data request to the smart mobile wallet ostensibly associated with the user and/or secondary user. Furthermore, the mDL management circuitry 208 may be configured to leverage the communications hardware 206 to receive user identification data from the smart mobile wallet ostensibly associated with the user and/or secondary user based on the user identification data request.

In various examples, the user identification data associated with a user and/or secondary user comprises cryptographical information associated with one or more of an mDL and/or a user device 110A associated with the user and/or secondary user. In some embodiments the cryptographical information associated with the mDL and/or the user device may be a public key of a public/private key pair, where the public key is provisioned to the user and/or secondary user by an IA upon issuance of the mDL. Such cryptographical information may be utilized by the insurance data exchange system 102 and/or an IA system (e.g., IA system 116A) associated with the IA that provisioned the mDL to verify the mDL, one or more portions of desired mDL credential data, and/or the user device associated with the user and/or secondary user. In this regard, the mDL management circuitry 208 may be configured to verify that the smart wallet ostensibly associated with the user and/or secondary user and/or the like is indeed associated with the user and/or secondary user.

Additionally, or alternatively, in some embodiments, the mDL management circuitry 208 may be configured to facilitate execution of secondary verification of a user and/or secondary user in addition to verifying the user and/or secondary user based on a corresponding mDL. In this regard, the mDL management circuitry 208 may be configured to facilitate the execution of a second verification protocol including one or more of facial recognition, voice recognition, and/or biometric verification techniques (e.g., fingerprint recognition, retina recognition, iris recognition). For example, the mDL management circuitry 208 may be configured to prompt a user and/or secondary user via a user device (e.g., user device 110A) to verify themselves via a secondary verification protocol (e.g., voice recognition) subsequent to verifying the user and/or secondary user based on an mDL associated with the user and/or secondary user.

Additionally, or alternatively, in some embodiments, the mDL management circuitry 208 may be configured to employ one or more facial recognition techniques to verify a user and/or secondary user during a secondary verification protocol. For example, mDL management circuitry 208 may be configured to verify a user and/or secondary user by matching image data related to the user and/or secondary user's face that is captured in real time, or near-real time, (e.g., via a camera of a user device 110A) to user portrait image data associated with an mDL related to the user and/or secondary user. In this regard, the mDL management circuitry 208 may be configured to generate an image matching score based on matching the image data of the user and/or secondary user's face captured in real time, or near-real time, to the user portrait image data associated with the user and/or secondary user's mDL.

As such, the mDL management circuitry 208 may be configured to determine if an image matching score (e.g., a numerical value or the like) satisfies a respective image matching threshold (e.g., a numerical value or the like). The image matching score may satisfy the respective image matching threshold if the image matching score is greater than or equal to the respective image matching threshold (e.g., to within an error value of ±1%, ±5%, or any other number). In other examples, the image matching score (e.g., a numerical value or the like) may satisfy the respective image matching threshold (e.g., a numerical value or the like) if the image matching score is less than or equal to the respective image matching threshold (e.g., to within an error value of ±1%, ±5%, or any other number). In this manner, the mDL management circuitry 208 may facilitate secondary verification protocols in order to verify a user and/or secondary user. These and other operations associated with the mDL management circuitry 208 will be described in further detail herein below with reference to FIGS. 3-7.

In addition, the apparatus 200 further comprises detection circuitry 210. In some embodiments, the detection circuitry 210 may be configured to facilitate the execution of one or more smart mobile wallet operations and/or operations for an insurance entity associated with the insurance data exchange system 102. Additionally, the detection circuitry 210 may utilize processor 202, memory 204, to perform these operations, as described in connection with FIGS. 3-7 below. The detection circuitry 210 may further utilize the communications hardware 206 to gather data from, or transmit data to, a variety of sources (e.g., user devices 110A-110N, provider devices 112A-112N, insurance entity devices 114A-114N, issuing authority (IA) systems 116A-

116N, and/or any storage devices associated with the insurance data exchange system 102), and/or the like. In some embodiments, the detection circuitry 210 may work in conjunction with the mDL management circuitry 208 in order to execute one or more of the methods described herein.

For example, in some embodiments, the detection circuitry 210 may integrate with and/or otherwise leverage the mDL management circuitry 208 to facilitate the verification of a user and/or secondary user. In this regard, the detection circuitry 210 may be configured to leverage the processor 202, the memory 204, and/or the communications hardware 206 to generate, cause transmission of, and/or cause display of a plurality of interactive user interface elements on a user device 110A associated with a software application instance. The plurality of interactive user interface elements may be configured as one or more interactive text fields, buttons, selectable images, hyperlinks, radio buttons, sliders, embedded multimedia modules, charts, graphs, prompts, notifications, banners, instructions, and/or the like configured to initiate execution of one or more commands (e.g., executable software instructions) based on an interaction (e.g., user input) with the plurality of interactive user interface elements.

Additionally, or alternatively, the detection circuitry 210 may be configured to leverage the processor 202, the memory 204, and/or the communications hardware 206 to generate and/or configure (e.g., instantiate, update) a smart mobile wallet comprising one or more of a plurality of interactive user interface elements. The detection circuitry 210 may generate a smart mobile wallet for a user and/or secondary user, and/or the like, based on user identification data associated with the user and/or secondary user. Additionally, the detection circuitry 210 may be configured to leverage the processor 202, the memory 204, and/or the communications hardware 206 to provide the smart mobile wallet to a user device 110A associated with the user and/or secondary user such that the user and/or secondary user is enabled to interact with and/or utilize the smart mobile wallet to execute various operations, operations, and/or the like.

For example, based on one or more interactions with a respective smart mobile wallet, the detection circuitry 210 may be configured to detect occurrence of the insurance event. Additionally, or alternatively, the detection circuitry 210 may be configured to, in response to detecting the occurrence of the insurance event, identify presence of a user device within a provider environment. Additionally, or alternatively, the detection circuitry 210 may be configured to transmit, based on the presence of the user within the provider environment, the identity verification request to the user device. These and other operations associated with the detection circuitry 210 will be described in further detail herein below with reference to FIGS. 3-7.

Although components 202-210 are described in part using functional language, it will be understood that the particular implementations necessarily include the use of particular hardware. It should also be understood that certain of these components 202-210 may include similar or common hardware. For example, the mDL management circuitry 208 and/or the detection circuitry 210 may each at times leverage use of the processor 202, memory 204, and/or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may, in addition, refer to software instructions that configure the hardware components of the apparatus 200 to perform the various functions described herein.

Although the mDL management circuitry 208 and/or the detection circuitry 210 may leverage processor 202, memory 204, and/or communications hardware 206 as described above, it will be understood that any of the mDL management circuitry 208 and/or the detection circuitry 210 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that the mDL management circuitry 208 and/or the detection circuitry 210 comprise particular machinery designed for performing the functions described herein in connection with such elements of apparatus 200.

As described herein, the user identification data associated with a user and/or secondary user may comprise cryptographical information associated with one or more of an mDL and/or a user device (e.g., user device 110A) associated with the user and/or secondary user. In some embodiments, the cryptographical information associated with the mDL and/or the user device may be a public key of a public/private key pair, where the public key is provisioned to the user and/or secondary user by an IA upon issuance of the mDL. Such cryptographical information may be utilized by the insurance data exchange system 102 and/or an IA system (e.g., IA system 116A) associated with the IA that provisioned the mDL to identify and/or authenticate the mDL, one or more portions of desired mDL credential data, and/or the user device associated with the user and/or secondary user.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of graphical user interfaces and flowcharts.

Example Operations

Turning to 3-7, example flowcharts are illustrated that contain example operations implemented by example embodiments described herein. The operations illustrated in FIGS. 3-7 may, for example, be performed by system device 104 of the insurance data exchange system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, mDL management circuitry 208, detection circuitry 210, and/or any combination thereof. It will be understood that user interaction with the insurance data exchange system 102 system may occur directly via communications hardware 206 or may instead be facilitated by a separate user device 110A-110N, provider device 112A-112N, insurance entity device 114A-114N, as shown in FIG. 1, and which may have similar or equivalent physical componentry facilitating such user interaction.

Figure 3:
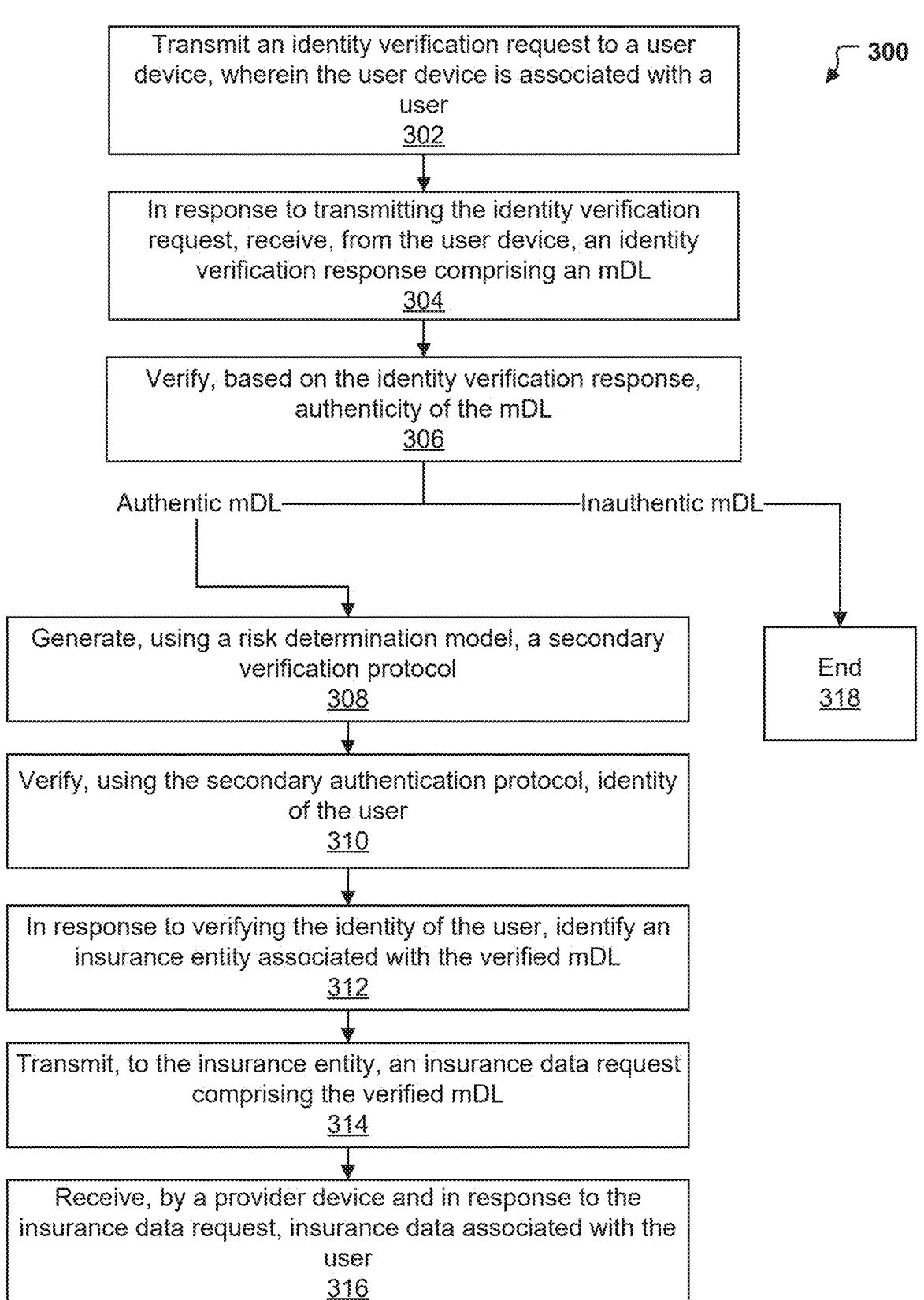
FIG. 3 illustrates an example flowchart for using a mobile driver's license (mDL) to enhance insurance data exchange for an insurance event, in accordance with some example embodiments described herein.

Turning first to FIG. 3, a procedure 300 illustrates example operations for using a mobile driver's license (mDL) to enhance insurance data exchange for an insurance event. An insurance event may refer to any occurrence that triggers the need for interaction with an insurance provider. This may include, but is not limited to medical visits (e.g., when a user visits a healthcare provider or medical facility and must provide insurance information for billing purposes), insurance claims (e.g., filing a claim for reimbursement or coverage for medical services rendered), policy verification (e.g., scenarios in which a user needs to verify the existence or details of their insurance coverage, such as during an emergency room visit or a specialist referral), preauthorization (e.g., obtaining preauthorization or approval from an insurance company for a particular medical procedure or treatment), eligibility check (e.g., confirming a user's eligibility for specific insurance benefits), and/or the like. In other words, an insurance event encompasses any scenario necessitating the verification and exchange of insurance data between the user, a provider, and the insurance entity.

As shown by operation 302, the apparatus 200 includes means, such as processor 202, memory 204, communications hardware 206, or the like, for transmitting an identity verification request to a user device, wherein the user device is associated with a user. An identity verification request may refer to a digital communication transmitted by communications hardware 206 from a provider device (e.g., provider device 112A) to a user device (e.g., user device 110A), aimed at verifying the identity of the user. The identity verification request may comprise elements requesting user identification data (e.g., name, date of birth, unique identifiers, etc.), verification purpose (e.g., a statement or a code indicating the reason for verification, such as accessing heath insurance information or confirming the identity of the user for a medical service), a session token (e.g., a unique, time-sensitive token or code that ensures that the identity verification request is tied to a specific session and cannot be reused or intercepted), and/or the like.

Figure 4:
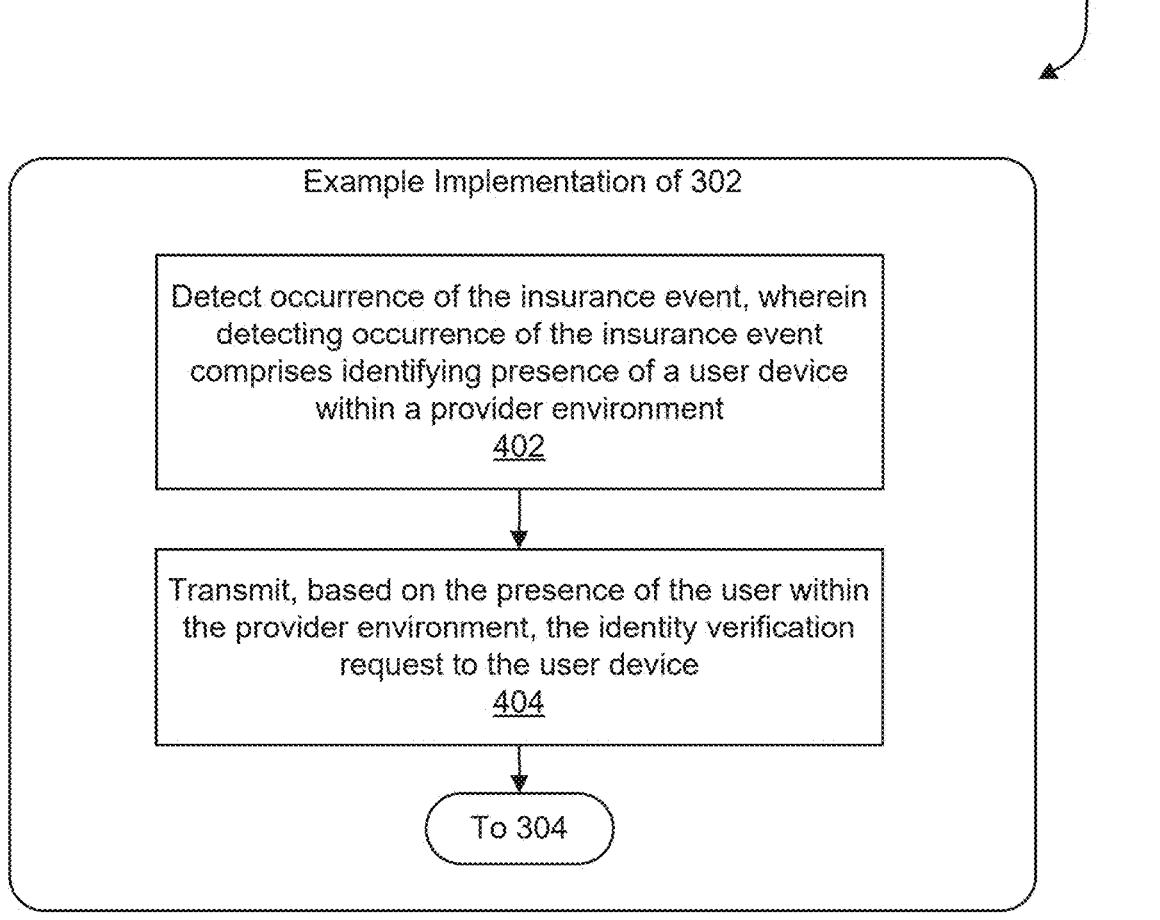
FIG. 4 illustrates an example flowchart for transmitting an identity verification request to a user device, in accordance with some example embodiments described herein.

In some embodiments, operation 302 may be performed in accordance with the operations described in FIG. 4. Turning now to FIG. 4, a procedure 400 illustrates example operations for transmitting an identity verification request to a user device, wherein the user device is associated with a user.

As shown by operation 402, the apparatus 200 includes means, such as processor 202, memory 204, communications hardware 206, detection circuitry 210, or the like, for detecting occurrence of the insurance event, wherein detecting occurrence of the insurance event comprises identifying presence of a user device within a provider environment. The detection circuitry 210 may employ various methods to detect occurrence of the insurance event. In some embodiments, when a user arrives at a provider facility and checks in via a self-service kiosk or through a receptionist, the detection circuitry 210 may log this action as an insurance event. In alternate embodiments, the detection circuitry 210 may be monitoring the provider's appointment scheduling system, and upon the arrival of the user at the scheduled time of the appointment, the detection circuitry 210 may log this action as an insurance event.

In some embodiments, individuals may be present in the provider environment that are not users (e.g., employees), whereas in alternate embodiments, users may not be seeking a service, but may still be present in the provider environment (e.g., for appointment scheduling). In either case, the detection circuitry 210 must differentiate between the various scenarios to detect whether a true insurance event has occurred. In some embodiments, the insurance data exchange system 102 may use a combination of geolocation technology and other insurance event indicators to detect that an insurance event is to occur. For instance, the provider environment may have a preestablished virtual boundary around their physical location using geofencing technology. When a user device 110A with location services enabled enters this geofenced area, the detection circuitry 210 may be triggered and use GPS or Wi-Fi signals to determine that a user device 110A is within the proximity of the provider environment. In alternate embodiments, the provider environment may be equipped with Bluetooth low energy (BLE) beacons that broadcast signals. When a user device 110A comes within range of these beacons, the detection circuitry 210 may detect the signal and may measure the signal strength from the BLE beacons to determine its proximity to the provider environment. In additional embodiments, the provider environment may include NFC readers at entry points or check-in locations. When a user device 110A with NFC capabilities comes into close proximity with these readers, the detection circuitry 210 may output a visitation purpose prompt to the user device 110A, asking the user to confirm whether their visit will necessitate exchange of insurance data. Other methods that the detection circuitry 210 may use to detect the presence of a user device 110A within a provider environment include Wi-Fi networks, SSID detection, QR code scanning, radio frequence identification (RFID), and/or the like.

Upon detecting the presence of a user device in the provider environment, the detection circuitry 210 may identify identity of the user associated with the user device and cross-reference their name with scheduled appointments. In some embodiments, users may be prompted with a visitation purpose prompt to select whether they are there for a scheduled appointment, a walk-in consultation, or other purposes. Based on the user's response to the visitation purpose prompt, the detection circuitry 210 may determine that the insurance event is true.

Finally, as shown by operation 404, the apparatus 200 includes means, such as processor 202, memory 204, communications hardware 206, or the like, for transmitting, based on the presence of the user within the provider environment, an identity verification request to the user device. Upon detecting occurrence of a true insurance event, communications hardware 206 may transmit an identity verification request to the user device 110A. The communications hardware 206 may transmit a push notification to the user device 110A through a secure messaging protocol (e.g., Apple Push Notification Service or Firebase Cloud Messaging). If the user device 110A has a provider-associated mobile application installed, the communications hardware 206 may transmit the identity verification request as an in-app notification. The identity verification request is a request asking the user to provide their mobile driver's license (mDL) to the provider. In some embodiments, based on the unique needs of a particular provider, the identity verification request may comprise additional data fields that the user may be required to provide to the provider (e.g., SSN, a self-declared status of whether the user is a primary policyholder or dependent, etc.). Upon receiving the identity verification request, the user device 110A may be displayed a guided user interface (GUI) that provides step-by-step instructions for submission of the identity verification request. The GUI may allow the user to input necessary details requested by the provider. Upon filling all data fields of the identity verification request, the user may submit the identity verification response after which communications hardware 206 of the insurance data exchange system may receive and transmit the identity verification response securely to the internal network of the provider (e.g., through an intranet of secure API call to the backend server). In some embodiments, the system device 104 may log the transmittal of the identity verification request and the receipt of the identity verification response.

Returning to FIG. 3, as shown by operation 304, the apparatus 200 includes means such as processor 202, memory 204, communications hardware 206, or the like, for in response to transmitting the identity verification request, receiving, from the user device, an identity verification response, wherein the identity verification response comprises a mobile driver's license (mDL). In embodiments where the identity verification request requires the user to self-declare whether they are a primary insurance policyholder or a dependent, the identity verification response may include this self-declared status.

If the identity verification request does not include a mDL associated with the user, the communications hardware 206 may output a mDL request to the user device (e.g., user device 110A) to which the identity verification request was originally transmitted. The mDL request may request the user to resubmit the identity verification response with the mDL of the user. The communications hardware 206 may also perform the aforementioned operation in instances in which a user's mDL in the identity verification response is unreadable.

In alternate embodiments, wherein the communications hardware 206 detects that the user's mDL is missing from the identity verification response, the communications hardware 206 may automatically retrieve the mDL from the user device's (e.g., user device 110A) smart mobile wallet, or may retrieve the user's mDL from a mDL database in storage device 106 of the insurance data exchange system 102 (e.g., in cases where the user's mDL was stored for a former identity verification request). Additionally, in alternate embodiments, wherein the communications hardware 206 detects that the user's mDL is missing from the identity verification request and/or that the user's mDL is corrupted, the communications hardware 206 may automatically proceed to operation 318 and failover to a traditional insurance data exchange process.

Figure 5:
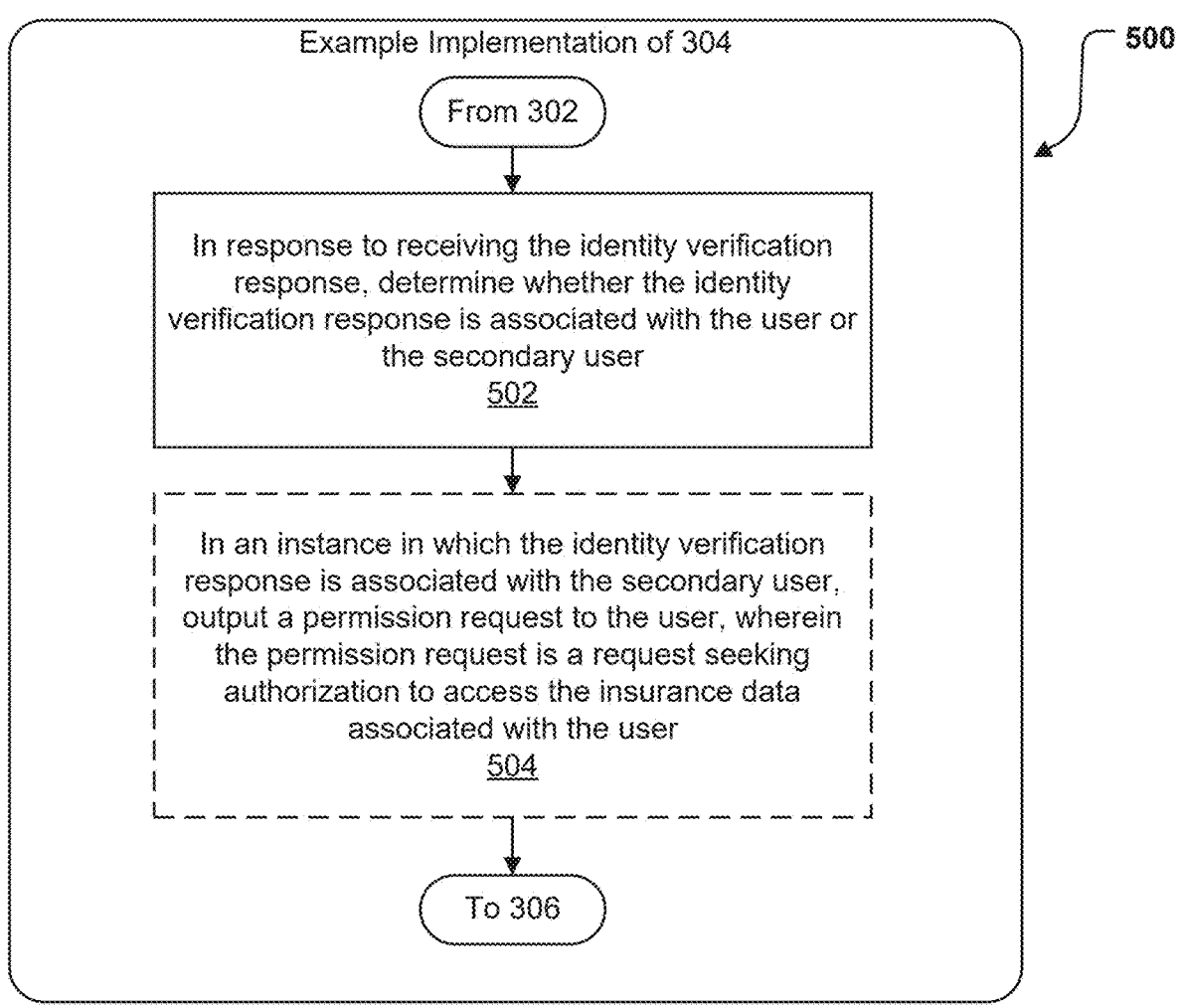
FIG. 5 illustrates an example flowchart for receiving, in response to transmitting the identity verification request and from the user device, an identity verification response, in accordance with some example embodiments described herein.

In some embodiments, operation 304 may be performed in accordance with the operations described in FIG. 5. Turning now to FIG. 5, a procedure 500 illustrates example operations in response to transmitting the identity verification request, receiving, from the user device, an identity verification response, wherein the identity verification response comprises a mobile driver's license (mDL).

As shown by operation 502, the apparatus 200 includes means, such as processor 202, memory 204, communications hardware 206, mDL management circuitry 208, or the like, for in response to receiving the identity verification response, determining, whether the identity verification response is associated with the user or a secondary user. A secondary user may refer to an individual who is covered under the insurance policy of a user (i.e., primary insurance policyholder) but is not the user themselves. This individual may typically benefit from the insurance coverage provided by the user's policy and may include dependents such as spouses, children, or other designated family members. The secondary user may be eligible for insurance benefits and services, as stipulated by the terms of the user's insurance policy but does not hold the primary contractual relationship with the insurance provider.

To determine whether the identity verification response is associated with the user or a secondary user, the mDL management circuitry 208 may extract the self-declared status of "primary policyholder" or "dependent" from the identity verification response. In instances in which the secondary user has self-declared themselves as a dependent, the identity verification response must include the name, mDL, and any other required and/or requested personal information of the user with whom the secondary user is associated. Based on the aforementioned information, the provider may have a historical record of eligible secondary users stored in their internal database for the particular user. As such, the mDL management circuitry 208 may match the provided name, mDL, and self-declared status of the secondary user, as provided in the identity verification response against the provider records for a particular user. If the mDL management circuitry 208 verifies that the secondary user is indeed an eligible dependent of the user, operation 504 may not occur. However, if the mDL management circuitry 208 is unable to verify that the secondary user is an eligible dependent of the user, operation 504 must occur.

Finally, as shown by operation 504, the apparatus 200 includes means, such as processor 202, memory 204, communications hardware 206, or the like, in an instance in which the identity verification response is associated with the secondary user, outputting a permission request to the user, wherein the permission request is a request seeking preauthorization to access the insurance data associated with the user. If the secondary user is not listed in the provider's records as being an eligible secondary user for a particular user, the mDL management circuitry 208 may generate a permission request. In some embodiments, the permission request may comprise a notification to the user detailing that an individual has identified themselves as a secondary user of the insurance policy held by the user and may request the user to confirm the validity of this information. In addition, the permission request must include a request for preauthorization for the provider to access insurance data for the insurance event associated with the secondary user. It is important to note that the permission request may not include the purpose of visit of the secondary user to ensure privacy. Further, the permission request may include details such as the secondary user's name, date of birth, and in some cases may comprise a real-time captured image of the user.

In some embodiments, the mDL management circuitry 208 may send an encrypted push notification via a mobile application associated with the provider, may send an encrypted email, or may use an integrated messaging system within a mobile application. The permission request may be encrypted by the mDL management circuitry 208 using end-to-end encryption protocols (e.g., public key infrastructure, secure sockets layer/transport layer security) to ensure confidentiality. In some embodiments, the mDL management circuitry 208 may use the provided information about the user from the identity verification response to identify a means of communication for transmitting the permission request. In some embodiments, the identity verification response may comprise a means of communicating with the user to whom the secondary user is affiliated with (e.g., email, phone number, etc.), and the mDL management circuitry 208 may use the provided information to transmit a permission request to the user. The user may review the notification and use the secure interface provided (e.g., a mobile app or secure web portal) to submit their response authorizing or denying access to the insurance data. In some embodiments, the user's response may be encrypted using similar end-to-end encryption protocols to ensure it cannot be intercepted or tampered with during transmission. The response may be transmitted back to the mDL management circuitry 208 via the secure communication channel established earlier. If the user is granted authorization, the procedure may proceed to operation 306. In some embodiments, the user may be allowed to customize insurance access controls so that the provider may only access certain insurance data when an eligible secondary user pays a visit to a service provider. However, if the user is not granted authorization, the procedure may end and failover to operation 318.

Returning to FIG. 3, as shown by operation 306, the apparatus 200 includes means such as processor 202, memory 204, communications hardware 206, mDL management circuitry 208, or the like, for verifying, based on the identity verification response, authenticity of the mDL.

Figure 6:
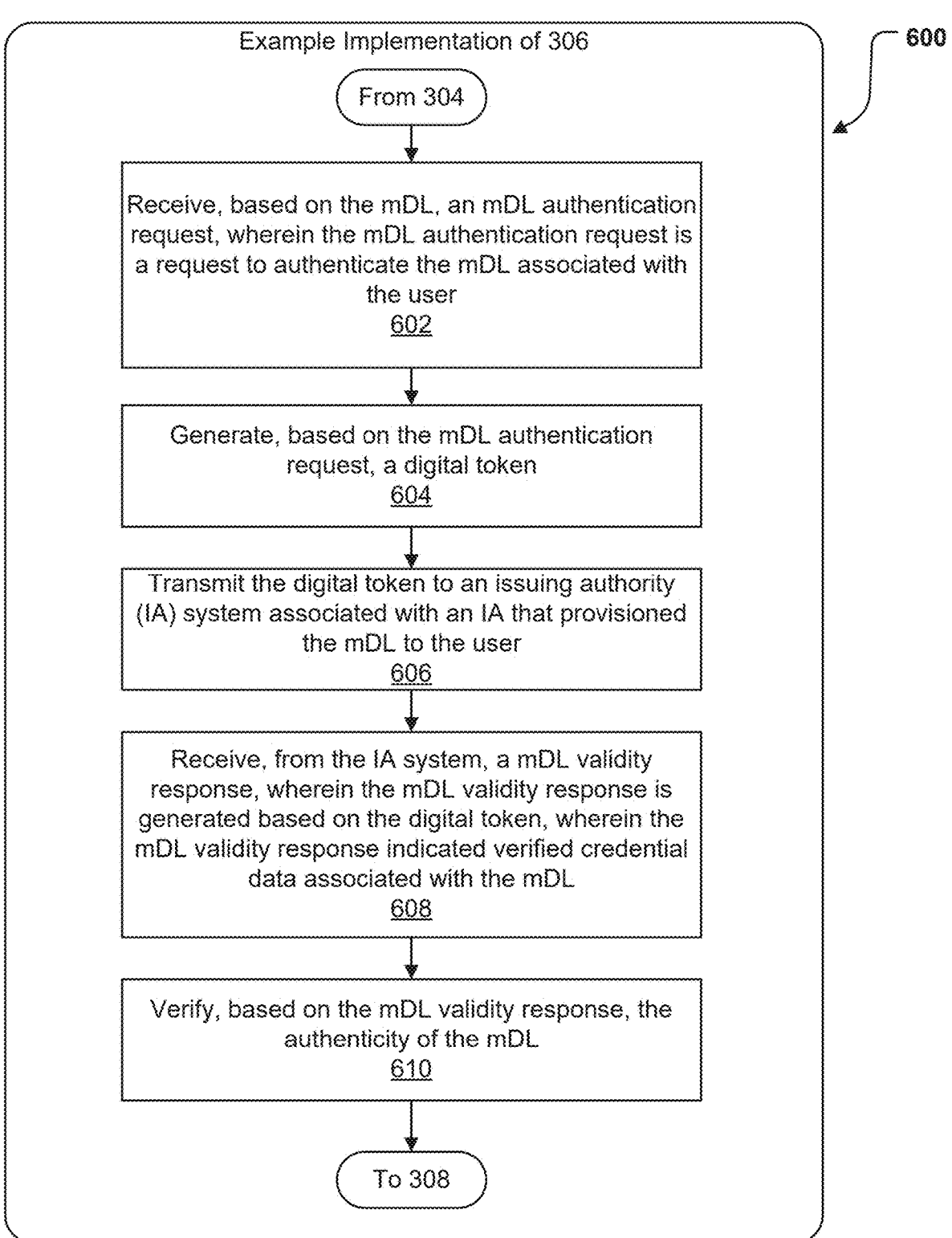
FIG. 6 illustrates an example flowchart for verifying, based on the identity verification response, authenticity of the mDL, in accordance with some example embodiments described herein.

In some embodiments, operation 306 may be performed in accordance with the operations described in FIG. 6. Turning now to FIG. 6, a procedure 600 illustrates example operations for verifying, based on the identity verification response, authenticity of the mDL.

As shown by operation 602, the apparatus 200 includes means, such as processor 202, memory 204, communications hardware 206, mDL management circuitry 208, or the like, for receiving, based on the mDL, an mDL authentication request, wherein the mDL authentication request is a request to authenticate the mDL associated with the user. In some embodiments, the mDL management circuitry 208 may be configured to facilitate (e.g., initiate, execute, manage) the operations of FIG. 6 in order to verify the authenticity of the mDL, based on the mDL received as part of the identity verification response. The mDL authentication request is a request to authenticate the mDL stored in the user device 110A (e.g., smart mobile wallet) associated with the user. In some embodiments, the mDL management circuitry 208 may be configured to facilitate the execution of the mDL authentication request based on one or more data features associated with the mDL authentication request. For example, in some embodiments, the mDL authentication request may comprise one or more of user identification data (e.g., cryptographic information associated with an mDL and/or a user device) associated with the user, desired credential data associated with the user's mDL (e.g., a particular request may indicate a need for verification of particular user information or personal identifying information of the user, particular credential validity data, and/or the like), and/or user attribute data associated with the user.

As shown by operation 604, the apparatus 200 includes means, such as processor 202, memory 204, communications hardware 206, mDL management circuitry 208, or the like, for generating, based on the mDL authentication request, a digital token. In some embodiments, the mDL management circuitry 208 may be configured to generate a digital token based in part on the mDL authentication request. By way of continued example, the mDL management circuitry 208 may be configured to generate a digital token comprising cryptographic information (e.g., public key information) associated with the mDL of the user. Additionally, in some embodiments, the cryptographic information associated with the user's mDL and comprised in the digital token may be user device identification data by which a user device 110A of the user may be uniquely identified.

As shown by operation 606, the apparatus 200 includes means, such as processor 202, memory 204, communications hardware 206, mDL management circuitry 208, or the like, for transmitting the digital token to an issuing authority (IA) system associated with an IA that provisioned the mDL to the user. By way of continued example, the mDL management circuitry 208 may leverage the communications hardware 206 to transmit the digital token to an IA system (e.g., IA system 116A) associated with the IA that provisioned the mDL to the user, such that the IA system (e.g., IA system 116A) may decrypt the cryptographic information comprised in the digital token. In this manner, the IA system (e.g., IA system 116A) may verify one or more portions of credential data associated with the user device 110A of the user.

In some embodiments, the mDL management circuitry 208 may determine that the IA that provisioned the mDL may no longer be applicable to the user (e.g., in situations where the user has moved to a different state). In such cases, the mDL management circuitry 208 may be configured to determine the correct IA system (e.g., a different IA system) associated with the user, such that the respective digital tokens generated based on respective mDL authentication requests are routed to the correct IA systems. In this manner, the insurance data exchange system 102 ensures the safe transmission of the respective digital tokens and the successful verification of the respective user mDLs, thereby verifying the identity of the user.

As shown by operation 608, the apparatus 200 includes means, such as processor 202, memory 204, communications hardware 206, mDL management circuitry 208, or the like, for receiving, from the IA system, a mDL validity response, wherein the mDL validity response is generated based on the digital token, wherein the mDL validity response indicates verified credential data associated with the mDL. For example, the communications hardware 206 may receive the mDL validity response from the IA system (e.g., IA system 116A) associated with the IA that provisioned the mDL to the user. In some embodiments, the mDL validity response is generated based on the digital token associated with the user and/or the user device 110A associated with the user. In some examples, the mDL validity response indicates verified credential data (e.g., desired credential data) associated with the mDL indicated by the mDL authentication request. Furthermore, in some examples, the mDL validity response may also indicate verified user device identification data related to the user device associated with the user (e.g., user device 110A).

Finally, as shown by operation 610, the apparatus 200 includes means, such as processor 202, memory 204, communications hardware 206, mDL management circuitry 208, or the like, for verifying, based on the mDL validity response, the authenticity of the mDL. By way of continued example, the mDL management circuitry 208 may be configured to verify the authenticity of the mDL based on the data comprised in the mDL validity response received from the IA system (e.g., one of IA systems 110A-110N). In this manner, the insurance data exchange system 102 may be configured to verify the authenticity of a mDL associated with a user.

Returning to FIG. 3, as shown by operation 308, the apparatus 200 includes means such as processor 202, memory 204, communications hardware 206, mDL management circuitry 208, or the like, for in response to verifying the authenticity of the mDL, generating, using a risk determination model, a secondary verification protocol. The secondary verification protocol serves as an additional layer of verification used to further confirm the identity of the user beyond the initial verification of the authenticity of the mobile driver's license. By this means, the secondary verification protocol provides an additional security layer, reducing the risk of unauthorized access by ensuring that even if the mDL is compromised, further verification is required to confirm the identity of the user. Additionally, the secondary verification protocol helps prevent identity fraud by adding complexity for potential attackers, making it more challenging to impersonate a legitimate user.

Figure 7:
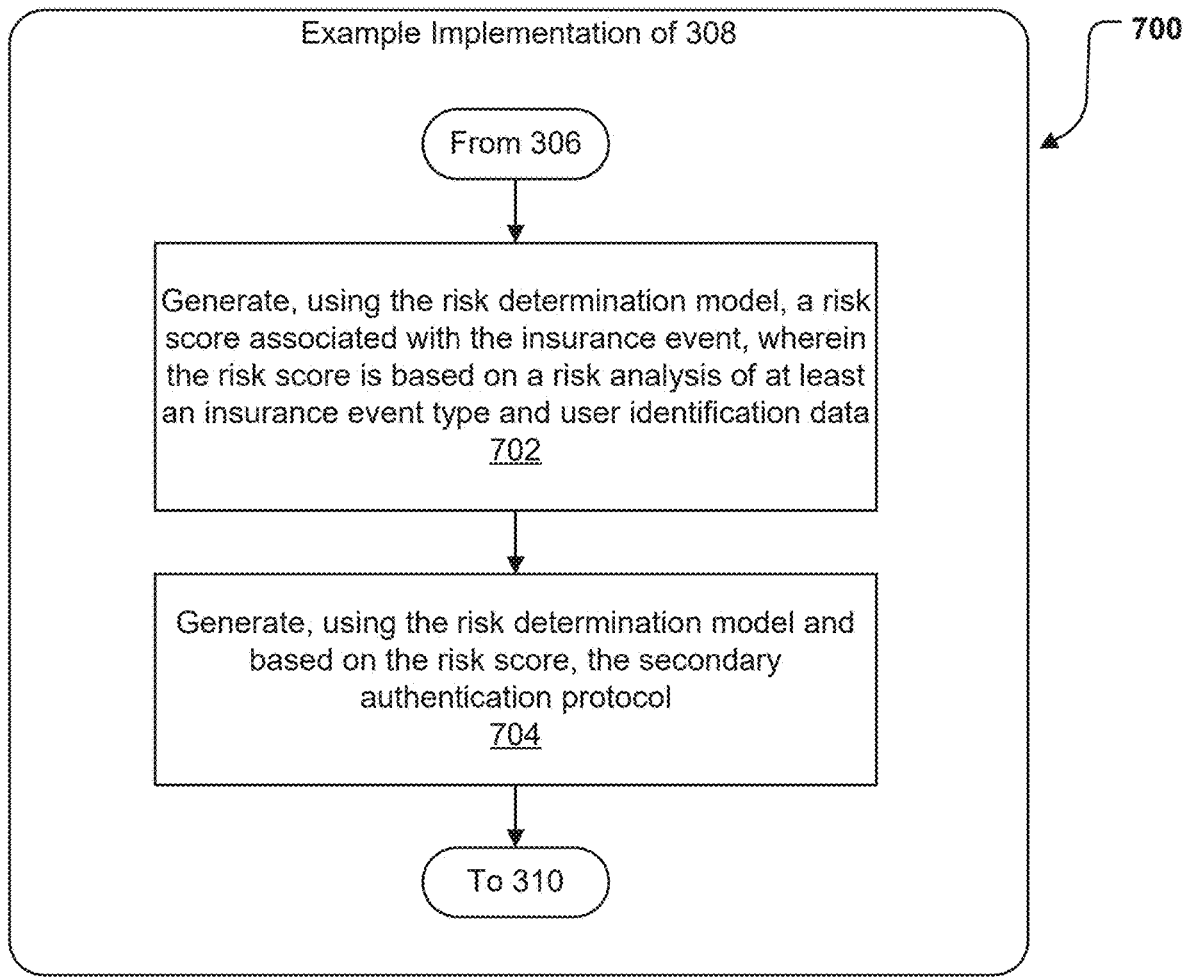
FIG. 7 illustrates an example flowchart for, generating, in response to verifying the authenticity of the mDL and using a risk determination model, a secondary verification protocol, in accordance with some example embodiments described herein.

Operation 308 may be performed in accordance with the operations described in FIG. 7. Turning now to FIG. 7, a procedure 700 illustrates example operations in response to verifying the authenticity of the mDL, generating, using a risk determination model, a secondary verification protocol.

As shown by operation 702, the apparatus 200 includes means, such as processor 202, memory 204, communications hardware 206, mDL management circuitry 208, or the like, for generating, using the risk determination model, a risk score associated with the insurance event, wherein the risk score is based on a risk analysis of at least an insurance event type and user identification data. In particular, an insurance event type may refer to the specific category or nature of an event for which insurance coverage is being sought or utilized.

Consider scenario A, where John Smith, a middle-aged adult born on Jan. 1, 1980, visits his healthcare provider for a routine check-up. He has no chronic illnesses and maintains his health with regular annual check-ups. His insurance policy number has been retrieved to be 123456. The routine nature of his visit, combined with his good health and proactive management, positions this as a low-risk event. When generating a risk score for John's routine check-up several factors may be considered. John's age may be factored in moderately contributing a small portion to the overall risk score. His medical history, which shows no chronic illnesses, further lowers the risk. The regularity of his visits indicates a low risk, as does the non-urgent nature of a routine check-up. Additionally, his minimal history of previous claims and the full insurance coverage for such visits results in a low total risk score for John's insurance event.

Consider scenario B where Jane Smith, an older adult born on May 15, 1975, visits the healthcare provider due to an emergency situation requiring surgery. Jane has a history of heart disease and has been hospitalized recently, which significantly affects her risk profile. Given the urgency and severity of an emergency surgery, this satiation may be classified as a high-risk insurance event. When calculating the risk score for Jane's emergency surgery, her may be a considerable factor contributing significantly to the risk sore. Her medical history of heart disease and recent hospitalizations indicate a high health risk, further increasing the score. The urgent nature of an emergency surgery raises the risk level. Additional, Jane's history of previous claims related to her heart condition is taken into account. Although her insurance covers emergency procedures, the potential high cost associated with the surgery adds to the risk. These factors collectively result in a high-risk sore for Jane's insurance event.

In particular, the risk determination model may process various data inputs, including insurance event type details as described in scenarios A and B above, the nature of the relationship between the provider and the user (first-time visit vs. a follow-up visit), and/or the like to generate a quantitative and/or qualitative risk score. The risk score may indicate the level of risk involved for a particular user and insurance event in the event fraud or error were to occur. In some embodiments, the risk determination model may be trained on available or sampled historical data with known outcomes (i.e., risk scores and corresponding risk level). For instance, a random forest classifier may be trained upon a labeled dataset comprising historical insurance data requests and their associated risk scores. The trained risk determination model may then be used to generate the risk score for an ongoing insurance event and may guide subsequent verification steps. The risk determination model may be trained upon predefined threshold for various risk scores indicative of various risk levels (e.g., low risk: 0-0.3, medium risk: 0.3-0.7, high risk: 0.7-1.0).

Finally, as shown by operation 704, the apparatus 200 includes means, such as processor 202, memory 204, communications hardware 206, mDL management circuitry 208, or the like, for generating, using the risk determination model, and based on the risk score, the secondary verification protocol. In some embodiments, examples of secondary verification protocols for a low-risk score include single-OTP verification (e.g., transmitting a one-time password to the user device 110A), password verification (e.g., simple password check or PIN entry), and/or the like. In alternate embodiments wherein the risk score is indicative of a medium level of risk, the secondary verification protocols which may be used comprise dual-factor authentication (2FA) (e.g., combining OTP with another method of authentication such as email verification or security questions), geolocation check (e.g., verifying the user's current location against known locations). In some embodiments, wherein the risk score is indicative of a high-risk level, the secondary verification protocols may comprise high risk protocols such as multi-factor verification (e.g., using multiple layers of verification including biometrics such as fingerprint, facial recognition, OTP, and user device based verification), document verification (e.g., requiring submission of additional identity documents for review by the provider, such as a physical driver's license), analysis of behavioral biometrics (e.g., typing patterns, device interactions), and/or the like. In this manner, the insurance data exchange system 102 effectively selects and implements an appropriate secondary verification protocol based on the generated risk score. Such a process ensures that higher-risk insurance events undergo more rigorous verification, enhancing security and reducing the likelihood of insurance fraud. By dynamically adjusting the verification protocol based on the anticipated risk, the insurance data exchange system 102 balances security measures with user convenience and needs of the provider.

Returning to FIG. 3, as shown by operation 310, the apparatus 200 includes means such as processor 202, memory 204, communications hardware 206, mDL management circuitry 208, or the like, for verifying, using the secondary verification protocol, identity of the user. To perform this verification, the mDL management circuitry 208 may capture in real-time an image of the user associated with the user device 110A and may compare the captured image against the user mDL submitted as part of the identity verification request. In some embodiments, the mDL management circuitry 208 may output an image capture request to the user using the user device 110A's camera. Subsequently, the captured image may be securely transmitted from the user device 110A to the mDL management circuitry 208 via communications hardware 206. The mDL management circuitry 208 may perform real-time analysis and verification of the captured image using advanced facial recognition algorithms. In particular, the mDL management circuitry 208 verify facial features such as eyes, nose, mouth, overall facial structure by comparing them against the facial features present in the user mDL. In some embodiments, the mDL management circuitry 208 may implement anti-spoofing measures (e.g., liveness detection such as blinking and facial movements, depth analysis, etc.) to ensure authenticity of the captured image. Based on a comprehensive analysis of the aforementioned features, the mDL management circuitry 208 may verify the user as being in control of the user device 110A, in which case subsequent operations may be performed to identify an insurance entity associated with the verified mDL.

As shown by operation 312, the apparatus 200 includes means such as processor 202, memory 204, communications hardware 206, mDL management circuitry 208, or the like, for in response to verifying the identity of the user, identifying an insurance entity associated with the verified mDL. The mDL management circuitry 208 may now have access to the insurance profile associated with the mDL of the user. The insurance profile may comprise detailed information about the user's insurance coverage including insurance provider names, policy numbers, and contact information for insurance entities. In some embodiments, the user profile database may be a secure, relational database (e.g., SQL, Oracle) or a NoSQL database that stores the corresponding insurance information of the user in a structured manner. The mDL management circuitry 208 may query the insurance profile by establishing a secure connection to the database using encryption protocols like SSL/TLS to protect data during transit. In some embodiments, the mDL management circuitry 208 may utilize the verified mDL to query the database. Key fields in the query may include insurance entity name, policy number, and contact details for the insurance entity, including API endpoints, email addresses, or phone numbers. In some embodiments, the mDL management circuitry 208 may extract, store, and link the aforementioned insurance information in an internal provider database for future insurance events associated with the user.

As shown by operation 314, the apparatus 200 includes means such as processor 202, memory 204, communications hardware 206, mDL management circuitry 208 or the like, for transmitting, to the insurance entity, an insurance data request. In some embodiments the insurance data request may comprise the verified mDL, whereas in alternate embodiments, the insurance data request may not comprise the verified mDL. The communications hardware 206 may access the retrieved insurance entity name and policy details to determine the appropriate endpoint and protocol for transmitting an insurance data request to the insurance entity. The insurance data request may comprise the purpose of visit (e.g., medical consultation, surgery, therapy, routine check-up), services requested, payment details (e.g., estimated costs), additional information (e.g., notes or special instructions from the provider). The mDL management circuitry 208 may aggregate the provider-specified details with the verified mDL and/or user identification data and may format the combined data into a standardized data exchange format (e.g., JSON, XML). The communications hardware 206 may encrypt the insurance data request comprising the aforementioned information and may subsequently transmit the encrypted insurance data request to an insurance entity device 114A associated with the insurance entity of interest.

Upon receiving the encrypted insurance data request, the insurance entity device 114A (e.g., a server device) may decrypt the insurance data request and verify the authenticity and integrity of the insurance data request. The insurance entity's backend system may query their internal databases using the verified mDL and user identification data. Using this information, the insurance entity may retrieve the requested insurance data such as coverage details (e.g., services covered, coverage limits), cost breakdowns (e.g., co-pays, deductibles, out-of-pocket expenses), eligibility criteria for specific services, payment obligations and/or any additional information requested by the provider. In some embodiments, the retrieved insurance data may be aggregated and formatted into a response (e.g., JSON, XML), and may be encrypted for secure transmission back to the provider device 112A via secure communication channels.

As shown by operation 316, the apparatus 200 includes means such as processor 202, memory 204, communications hardware 206, or the like, for receiving, by a provider device, and in response to the insurance data request, insurance data associated with the user. The communications hardware 206 may receive the encrypted response and decrypt it for processing by the insurance data exchange system 102. In particular, the provider device 112A may use the received insurance data to automatically determine the user's eligibility for the requested services. Additionally, recommendations may be generated based on coverage details and cost breakdowns (e.g., whether to proceed with a service, potential out-of-pocket expenses). In some embodiments, such recommendations may also be transmitted to the user device 110A to inform them of their insurance data. Based on the received insurance data, the provider may recommend a course of action that is most appropriate considering their insurance coverage and outstanding financial obligations.

In some embodiments, the communications hardware 206 may populate a data field for a provider form based on the received insurance data. Consider the example wherein the provider is a medical service provider. Examples of data fields for such a provider form include personal information (e.g., full name, date of birth, address, phone number, email address, social security number), insurance information (e.g., insurance provider name, policy number, group number, insurance plan type, policyholder's name (if different from the patient), policyholder's date of birth, relationship to policyholder), medical information (e.g., primary care physician, referring physician, medical history, current medications, allergies, emergency contact information), payment information (e.g., co-payments, deductibles, claim amount to be covered by the insurance entity), and/or the like. Based on the aforementioned insurance data, the communications hardware 206 may map the example data fields to the provider's form. For instance, the received insurance provider name (e.g., Aetna) may be mapped to "Insurance Provider Name" field in the provider form. The communications hardware 206 may securely transmit the mapped data to the provider's system via secure APIs, encrypted data streams, or direct input into the provider's electronic form system. To do this, the communications hardware 206 may use integration software (e.g., Mirth Connect, Cloverleaf, etc.), API and web services (e.g., the provider may have preestablished practice management systems to update patient insurance information), and/or the like.

In some embodiments, the communications hardware 206, upon populating all required data fields may perform a validation check to ensure insurance data integrity and accuracy. If any errors or issues are encountered during the exchange of insurance data, the communications hardware 206 may log the error and flag the data field and/or the provider form to indicate to the provider that a technical issue has occurred, and the user's insurance information may not have been accurately updated. Following the flagging of the data field and/or the provider form, the communications hardware 206 may attempt to complete operation 902 again. In some embodiments, the communications hardware 206 may be permitted to perform an infinite number of form population attempts, whereas in alternate embodiments, the communications hardware 206 may have preexisting rules and conditions to follow that only allow for a particular number of form population attempts.

As shown by operation 318, the apparatus 200 includes means such as processor 202, memory 204, communications hardware 206, mDL management circuitry 208, detection circuitry 210, or the like, for ending procedure 300 in an instance in which the mDL associated with the user is inauthentic. In some embodiments, if the mDL management circuitry 208 determines that the user mDL is inauthentic, the mDL management circuitry 208 may be configured to generate an inauthentic mDL alert. In particular, an inauthentic mDL alert may be an alert, notification, warning, advisory, and/or the like that indicates various data related to a failed mDL verification attempt. The inauthentic mDL alert may comprise data (e.g., user device identification data, timestamp data associated with the mDL authentication attempt, geolocation data associated with the user during a time in which the mDL authentication attempt was executed, as indicated by GPS data collected and/or generated by a user device) related to a user whose mDL was not successfully verified to be authentic.

In some embodiments, an inauthentic mDL alert may be configured as a notification, email, text message, direct application message (e.g., via a software application instance associated with the insurance data exchange system 102), audio message (e.g., automated voice message), banner notification, and/or the like. The mDL management circuitry 208 may be configured to leverage the communications hardware 206 to transmit the inauthentic mDL alert to one or more computing devices (e.g., user device 110A-110N, provider device 112A-112N, insurance entity device 114A-114N, IA systems 116A-116N, and/or the like) via a number of different communication methods over a communications network (e.g., communications network 108).

In this regard, the mDL management circuitry 208 may be configured to identify one or more individuals affiliated with the provider and/or insurance entity to transmit the inauthentic mDL alert to. For example, the mDL management circuitry 208 may be configured to identify one or more personnel affiliated with the particular insurance entity and provider and cause transmission of the inauthentic mDL alert to the one or more provider device 112A-112N, insurance entity devices 114A-114N, and/or the like. In alternate embodiments wherein the verification of the mDL authenticity indicates that the user mDL is inauthentic (e.g., due to a corrupted mDL), operation 314 may failover to a traditional insurance data exchange process to share the user's insurance data with a particular provider (e.g., manual means of exchanging insurance data). In some embodiments the mDL management circuitry 208 may be configured to transmit the inauthentic mDL alert to the user device 110A as well to notify the user of the outcome of the authenticity verification of their mDL.

FIGS. 3-7 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable efficient exchange of insurance data during an insurance event. Example embodiments thus provide tools that overcome the problems faced by conventional insurance data exchange mechanisms and techniques. By avoiding the use of conventional insurance data exchange mechanisms and techniques, example embodiments thus save time and resources, while also eliminating the need for manual verification of users and completion of provider forms. Moreover, embodiments described herein counter a wide range of emerging risks in an evolving technological landscape. Finally, by automating functionality that has historically required human analysis, the speed and consistency of the insurance data exchange performed by example embodiments unlocks many potential new functions that have historically not been available, such as the ability to conduct near-real-time insurance data exchange.

For instance, by utilizing mDLs to verify users for an insurance event, example embodiments provide protection against the loss, theft, and/or misuse of insurance data shared with providers during insurance events. As such, by streamlining and automating insurance data exchange for an insurance event, resources and material costs are significantly lowered for service providers. Example embodiments also reduce the technical complexity of requiring manual verification of users. As such, example embodiments provide additional layers of security to ensure the accurate and efficient verification of users and insurance data exchange for a particular insurance event.

Moreover, example embodiments contemplated herein provide technical solutions that solve real-world problems faced by service providers who wish to safely receive insurance data of users by employing various mDL-based verification techniques. While confirming the identity of a user has been a technical challenge for several years, the sophistication of identity fraud and impersonation techniques have made this problem significantly more acute. By requiring a legally issued mDL to verify the identity of a user prior to initiating the exchange of insurance data, embodiments of the present disclosure ensure that users are properly verified for a particular insurance event, thereby increasing the security and safety of insurance data exchange for both a user and a service provider.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for using a mobile driver's license (mDL) to enhance insurance data exchange for an insurance event, the method comprising:

detecting, by detection circuitry, occurrence of the insurance event, wherein detecting the occurrence of the insurance event comprises identifying a presence of a user device within a provider environment using a previously established virtual boundary, wherein the previously established virtual boundary goes around a physical location and was made using geofencing technology;

transmitting, by communications hardware, an identity verification request to a to the user device, wherein the user device is associated with a user;

in response to transmitting the identity verification request, receiving, by the communications hardware and from the user device, an identity verification response, wherein the identity verification response comprises the mDL;

verifying, by mDL management circuitry and based on the identity verification response, authenticity of the mDL, wherein verifying the authenticity of the mDL comprises:

receiving, by the mDL management circuitry and based on the mDL, an mDL authentication request, wherein the mDL authentication request is a request to authenticate the mDL associated with the user;

generating, by the mDL management circuitry and based on the mDL authentication request, a digital token, transmitting, by the mDL management circuitry, the digital token to an issuing authority (IA) system associated with an IA that provisioned the mDL to the user, receiving, by the mDL management circuitry and from the IA system, a mDL validity response, wherein the mDL validity response is generated based on the digital token, wherein the mDL validity response indicates verified credential data associated with the mDL, and verifying, by the mDL management circuitry and based on the mDL validity response, the authenticity of the mDL;

in response to verifying the authenticity of the mDL, generating, by the mDL management circuitry and using a risk determination model, a secondary verification protocol;

verifying, by the mDL management circuitry and using the secondary verification protocol, an identity of the user;

in response to verifying the identity of the user, identifying, by the mDL management circuitry, an insurance entity associated with the mDL;

transmitting, by the communications hardware and to the insurance entity, an insurance data request; and causing transmission to a provider device, and in response to the insurance data request, insurance data associated with the user.

2. The method of claim 1, wherein transmitting the identity verification request further comprises:

transmitting, by the detection circuitry and based on the presence of the user within the provider environment, the identity verification request to the user device.

3. The method of claim 1, wherein, in an instance in which the mDL of the user is further associated with a secondary user, the method further comprises:

in response to receiving the identity verification response, determining, by the mDL management circuitry, whether the identity verification response is associated with the user or the secondary user; and in an instance in which the identity verification response is associated with the secondary user, outputting, by the communications hardware, a permission request to the user, wherein the permission request is a request seeking preauthorization to access the insurance data associated with the user.

4. The method of claim 1, wherein the mDL authentication request comprises one or more of user identification data, credential data associated with the mDL, or user attribute data associated with the user.

5. The method of claim 1, wherein generating the secondary verification protocol further comprises:

generating, by the mDL management circuitry and using the risk determination model, a risk score associated with the insurance event, wherein the risk score is based on a risk analysis of at least an insurance event type and user identification data; and generating, by the mDL management circuitry and using the risk determination model, and based on the risk score, the secondary verification protocol.

6. The method of claim 4, wherein verifying the identity of the user further comprises verifying, by the mDL management circuitry and based on the user identification data, that the user is in control of the user device.

7. The method of claim 1, further comprising populating, by the communications hardware and based on the insurance data, a data field for a provider form.

8. An apparatus for using a mobile driver's license (mDL) to enhance insurance data exchange for an insurance event, the apparatus comprising:

detection circuitry configured to detect occurrence of the insurance event, wherein detecting the occurrence of the insurance event comprises identifying a presence of a user device within a provider environment using a previously established virtual boundary, wherein the previously established virtual boundary goes around a physical location and was made using geofencing technology;

communications hardware configured to:

transmit an identity verification request to the user device, wherein the user device is associated with a user, and in response to transmitting the identity verification request, receive from the user device, an identity verification response, wherein the identity verification response comprises the mDL; and mDL management circuitry configured to:

verify, based on the identity verification response, authenticity of the mDL, wherein to verify the authenticity of the mDL, the mDL is further configured to:

receive, based on the mDL, an mDL authentication request, wherein the mDL authentication request is a request to authenticate the mDL associated with the user;

generate, based on the mDL authentication request, a digital token;

transmit the digital token to an issuing authority (IA) system associated with an IA that provisioned the mDL to the user;

receive, from the IA system, a mDL validity response, wherein the mDL validity response is generated based on the digital token, and where the mDL validity response indicates verified credential data associated with the mDL; and verify, based on the mDL validity response, the authenticity of the mDL;

in response to verifying the authenticity of the mDL, generate, using a risk determination model, a secondary verification protocol, verify, using the secondary verification protocol, an identity of the user, and in response to verifying the identity of the user, identify an insurance entity associated with the mDL, wherein the communications hardware is further configured to:

transmit to the insurance entity, an insurance data request, and cause transmission, to a provider device and in response to the insurance data request, insurance data associated with the user.

9. The apparatus of claim 8, wherein the communications hardware is further configured to:

transmit, based on the presence of the user within the provider environment, the identity verification request to the user device.

10. The apparatus of claim 8, wherein the mDL management circuitry is further configured to, in an instance in which the mDL of the user is associated with a secondary user:

in response to receiving the identity verification response, determine whether the identity verification response is associated with the user or the secondary user, wherein the communications hardware is further configured to:

in an instance in which the identity verification response is associated with the secondary user, output a permission request to the user, wherein the permission request is a request seeking preauthorization to access the insurance data associated with the user.

11. The apparatus of claim 8, wherein the mDL management circuitry is further configured to:

generate, and using the risk determination model, a risk score associated with the insurance event, wherein the risk score is based on a risk analysis of at least an insurance event type and user identification data; and generate, using the risk determination model and based on the risk score, the secondary verification protocol.

12. The apparatus of claim 11, wherein the mDL management circuitry is further configured to verify, based on the user identification data, that the user is in control of the user device.

13. The apparatus of claim 8, wherein the communications hardware is further configured to:

populate, based on the insurance data, a data field for a provider form.

14. A computer program product for using a mobile driver's license (mDL) to enhance insurance data exchange for an insurance event, the computer program product comprising at least one non-transitory computer readable storage medium storing software instructions that, when executed, cause an apparatus to:

detect, by detection circuitry, occurrence of the insurance event, wherein detecting the occurrence of the insurance event comprises identifying a presence of a user device within a provider environment using a previously established virtual boundary, wherein the previously established virtual boundary goes around a physical location and was made using geofencing technology;

transmit an identity verification request to the user device, wherein the user device is associated with a user;

in response to transmitting the identity verification request, receiving from the user device, an identity verification response, wherein the identity verification response comprises the mDL;

verify, based on the identity verification response, authenticity of the mDL, wherein to verify the authenticity of the mDL, by causing an apparatus to:

receive, based on the mDL, an mDL authentication request, wherein the mDL authentication request is a request to authenticate the mDL associated with the user;

generate, based on the mDL authentication request, a digital token;

transmit the digital token to an issuing authority (IA) system associated with an IA that provisioned the mDL to the user;

receive, from the IA system, a mDL validity response, wherein the mDL validity response is generated based on the digital token, and where the mDL validity response indicates verified credential data associated with the mDL; and verify, based on the mDL validity response, the authenticity of the mDL;

in response to verifying the authenticity of the mDL, generate, using a risk determination model, a secondary verification protocol, verify, using the secondary verification protocol, an identity of the user, in response to verifying the identity of the user, identify an insurance entity associated with the mDL;

transmit to the insurance entity, an insurance data request, and cause transmission, to a provider device and in response to the insurance data request, insurance data associated with the user.

15. The computer program product of claim 14, wherein the software instructions, when executed, further cause the apparatus to:

transmit, based on the presence of the user within the provider environment, the identity verification request to the user device.

16. The computer program product of claim 14, wherein the software instructions, when executed, in an instance in which the mDL of the user is associated with a secondary user, further cause the apparatus to:

in response to receiving the identity verification response, determine whether the identity verification response is associated with the user or the secondary user; and in an instance in which the identity verification response is associated with the secondary user, output a permission request to the user, wherein the permission request is a request seeking preauthorization to access the insurance data associated with the user.

17. The computer program product of claim 14, wherein the software instructions, when executed, further cause the apparatus to:

generate, using the risk determination model, a risk score associated with the insurance event, wherein the risk score is based on a risk analysis of at least an insurance event type; and generate, using the risk determination model and based on the risk score, the secondary verification protocol.

* * * * *